United States Patent
Davis, Jr.

(10) Patent No.: US 7,383,943 B1
(45) Date of Patent: Jun. 10, 2008

(54) METHOD OF REPAIRING A SLAT CONVEYOR

(76) Inventor: Guy E. Davis, Jr., 3020 N. 38th St., Milwaukee, WI (US) 53210

( * ) Notice: Subject to any disclaimer, the term of this patent is extended or adjusted under 35 U.S.C. 154(b) by 235 days.

(21) Appl. No.: 11/442,049

(22) Filed: May 26, 2006

(51) Int. Cl.
*B65G 21/02* (2006.01)
*B65G 21/04* (2006.01)

(52) U.S. Cl. .................. 198/860.1; 198/748; 198/850; 269/97

(58) Field of Classification Search ................ 198/748, 198/850, 860.1; 296/97
See application file for complete search history.

(56) References Cited

U.S. PATENT DOCUMENTS

| | | | |
|---|---|---|---|
| 4,098,394 A * | 7/1978 | Stahura | 198/499 |
| 4,427,190 A * | 1/1984 | Stolz | 269/32 |
| 5,167,437 A | 12/1992 | Merten et al. | 299/34 |
| 5,725,269 A * | 3/1998 | Daniels et al. | 294/132 |
| 6,068,318 A * | 5/2000 | Freund | 294/103.1 |
| 2003/0177627 A1 | 9/2003 | Richardson | 29/428 |

OTHER PUBLICATIONS

Printout of Webpage From www.lkgoodwin.com, on May 17, 2006.

* cited by examiner

*Primary Examiner*—Gene O. Crawford
*Assistant Examiner*—Kavel P Singh
(74) *Attorney, Agent, or Firm*—Donald J. Ersler (57) ABSTRACT

A method of repairing a slat conveyor includes an anchor bar and a ratchet puller. The anchor bar preferably includes an anchor frame and a pair of C-clamps. A first C-clamp is pivotally coupled to a first end of the anchor bar with at least one link and the second C-clamp is coupled to a second end of the anchor bar with at least one link. The anchor bar is secured to conveyor frame with the pair of C-clamps. A first end of the ratchet puller is secured to the anchor bar and to a first end of a broken conveyor chain. A second end of the ratchet puller is attached to a second end of the broken conveyor chain. The ratchet puller is actuated, until the first and second ends of the broken chain meet.

19 Claims, 7 Drawing Sheets

METHOD OF REPAIRING A SLAT CONVEYOR

BACKGROUND OF THE INVENTION

1. Field of the Invention

The present invention relates generally to conveyor repair and more specifically to a method of repairing a slat conveyor, which includes all the elements required to make a repair on a slat conveyor.

2. Discussion of the Prior Art

One use for slat conveyors is the transfer of large amounts of asphalt into a storage silo. The slat conveyor includes a chain and a plurality of slats. The slats are attached at predetermined distances around an outer perimeter of the chain. The chain is driven by a motor and supported by a plurality of idler shafts. The plurality of idler shafts are rotatably retained by a plurality of bearings. The chain, one of the idler shafts or one of the bearings will periodically break and require repair. The chain of the slat conveyor is typically repaired by securing an angle iron, a 4×4 stud or other cross member across a width of the conveyor with a pair of C-clamps. Each C-clamp is attached to an opposing conveyor frame rail and to an opposing end of the cross member. One end of the ratchet puller is secured to the cross member. The other end of the ratchet puller is secured to the other end of the chain. The ratchet puller is actuated, until the ends of the chain are brought together.

Accordingly, there is a clearly felt need in the art for a method of repairing a slat conveyor, which does not require a repairman to gather individual elements required to make a repair of the slat conveyor.

SUMMARY OF THE INVENTION

The present invention provides a method of repairing a slat conveyor, which includes all the elements required to make a repair on a slat conveyor. The method of repairing a slat conveyor includes an anchor bar and a ratchet puller. The anchor bar preferably includes an anchor frame and a pair of C-clamps. The anchor frame preferably includes a first L-frame and a second L-frame member. A first link connector extends from one end of the first L-frame member and a second link connector extends from one end of the second L-frame member. The other end of the first L-frame member is sized to receive the other end of the second L-frame member. At least one lock pin axially retains the first and second L-frame members relative to each other. A first C-clamp is pivotally coupled to the first link connector with at least one link and a second C-clamp is coupled to the second link connector with at least one link.

The ratchet puller includes a ratchet member and a pulling chain extending from one side of the ratchet member. A first hook extends from an end of the pulling chain. A second hook extends from the other side of the ratchet member. The anchor bar is secured to slat conveyor frame rails by placing thereof across the conveyor and securing the C-clamps to first and second conveyor frame rails. The first hook is inserted through a first end of the broken conveyor chain, wrapped around the anchor frame and attached to the pulling chain. The second hook is attached to a second end of the broken conveyor chain. The ratchet member is actuated with a lever, until the first and second ends of the broken chain meet.

Accordingly, it is an object of the present invention to provide a method of repairing a slat conveyor, which does not require a repairman to gather individual elements required to make a repair.

These and additional objects, advantages, features and benefits of the present invention will become apparent from the following specification.

DETAILED DESCRIPTION OF THE PREFERRED EMBODIMENTS

Figure 1:
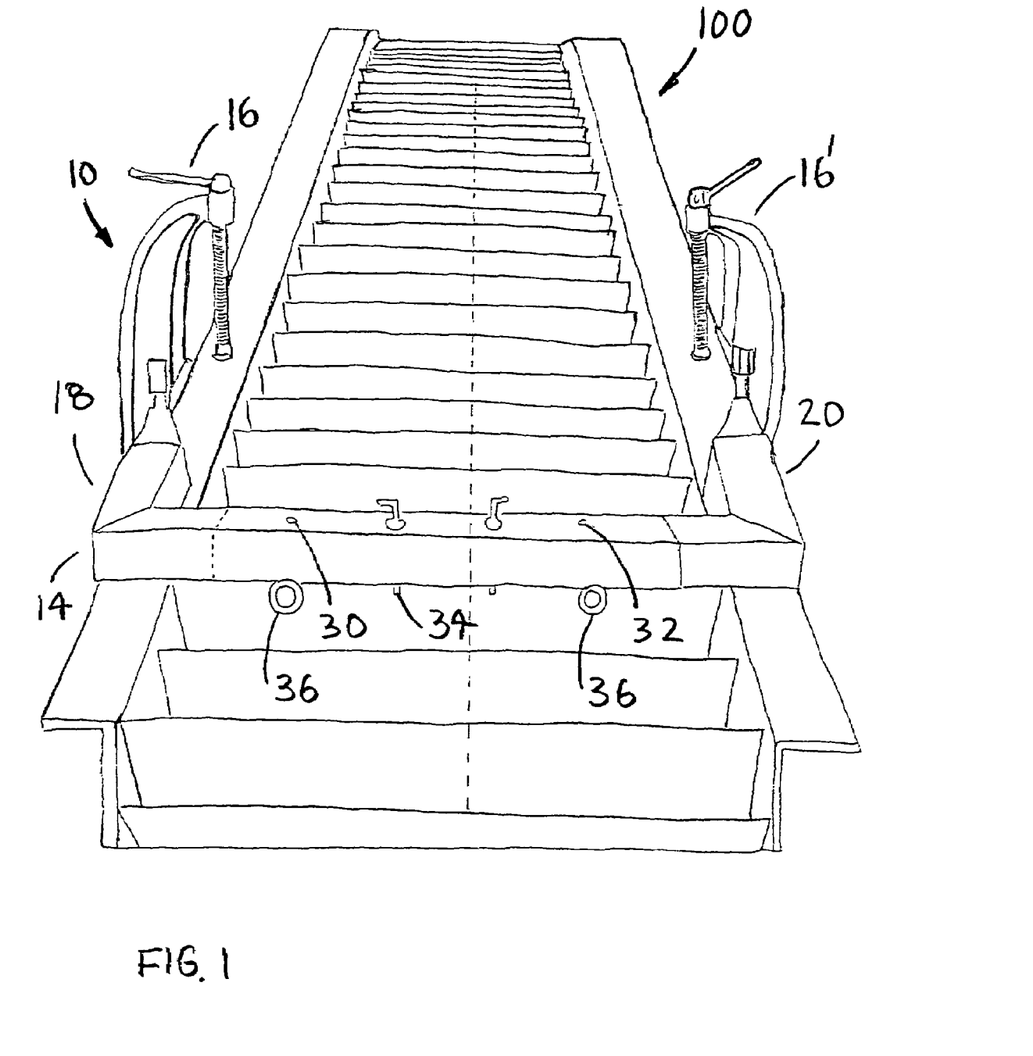
FIG. 1 is a perspective view of a slat conveyor with an anchor bar attached thereto of a method of repairing a slat conveyor in accordance with the present invention.
Figure 4:
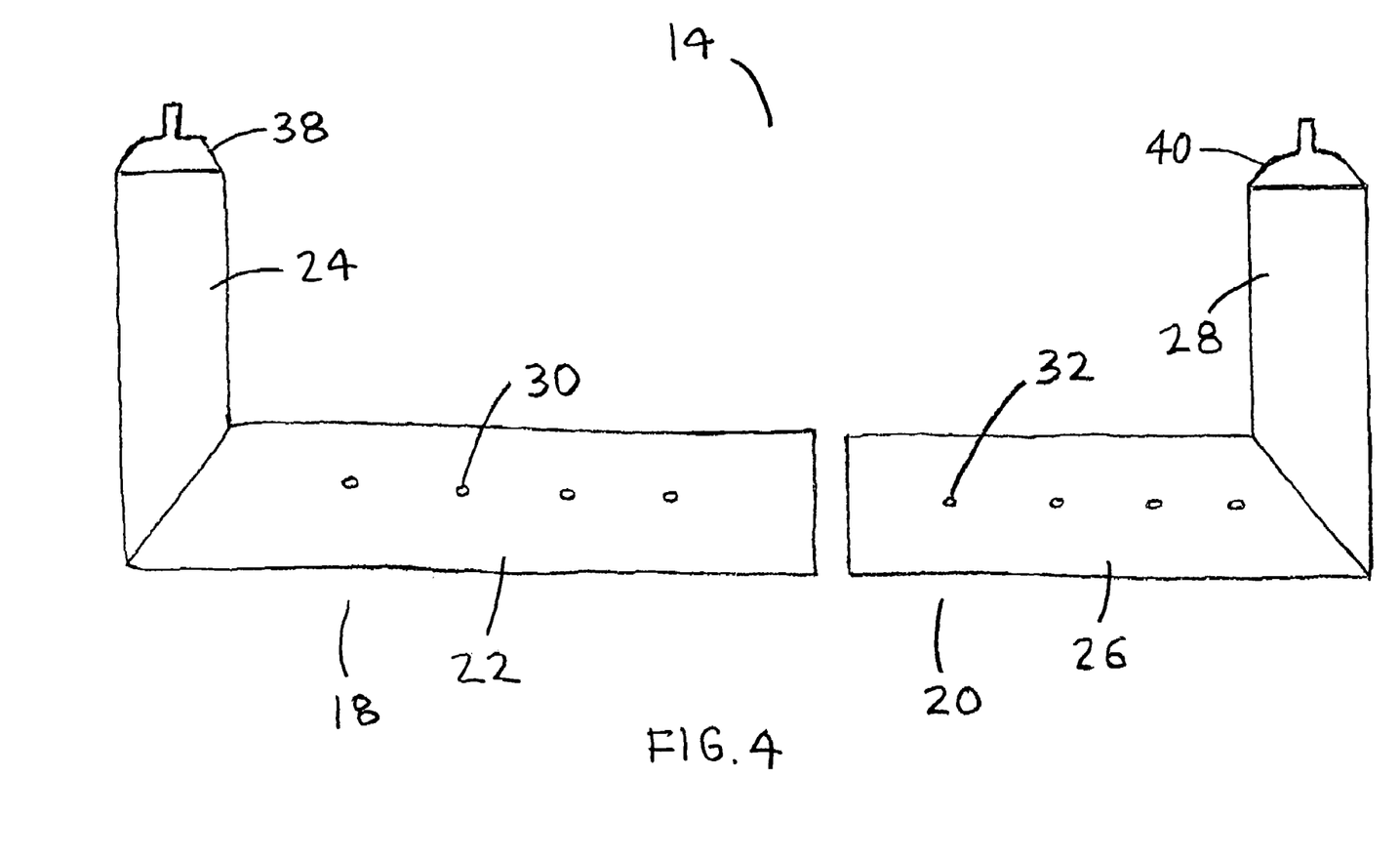
FIG. 4 is an exploded top view of an anchor frame of a method of repairing a slat conveyor in accordance with the present invention.
Figure 7:
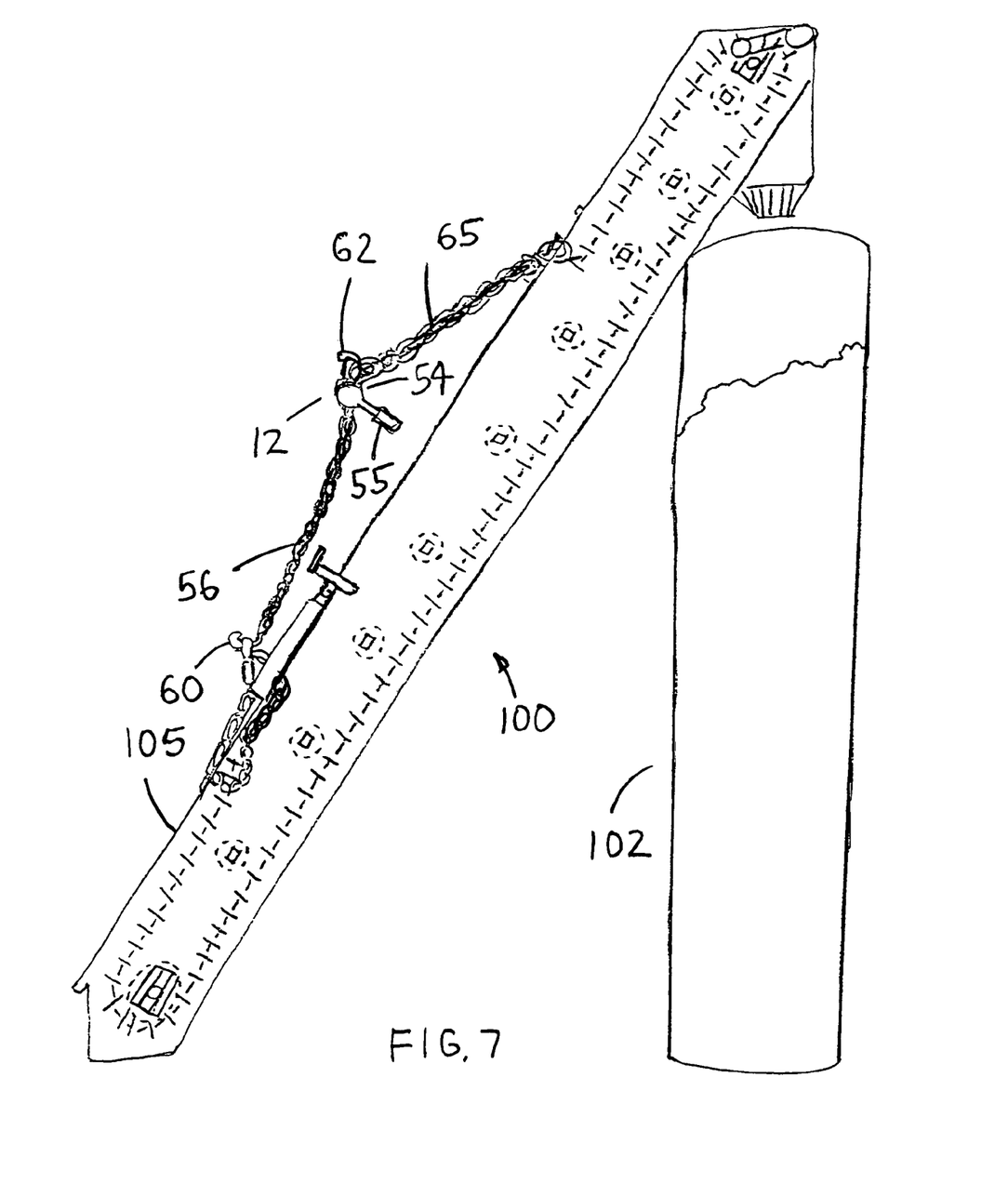
FIG. 7 is a side view of a slat conveyor with an anchor bar attached thereto and a ratchet puller being coupled to each end of a broken conveyor chain in accordance with the present invention.
Figure 8:
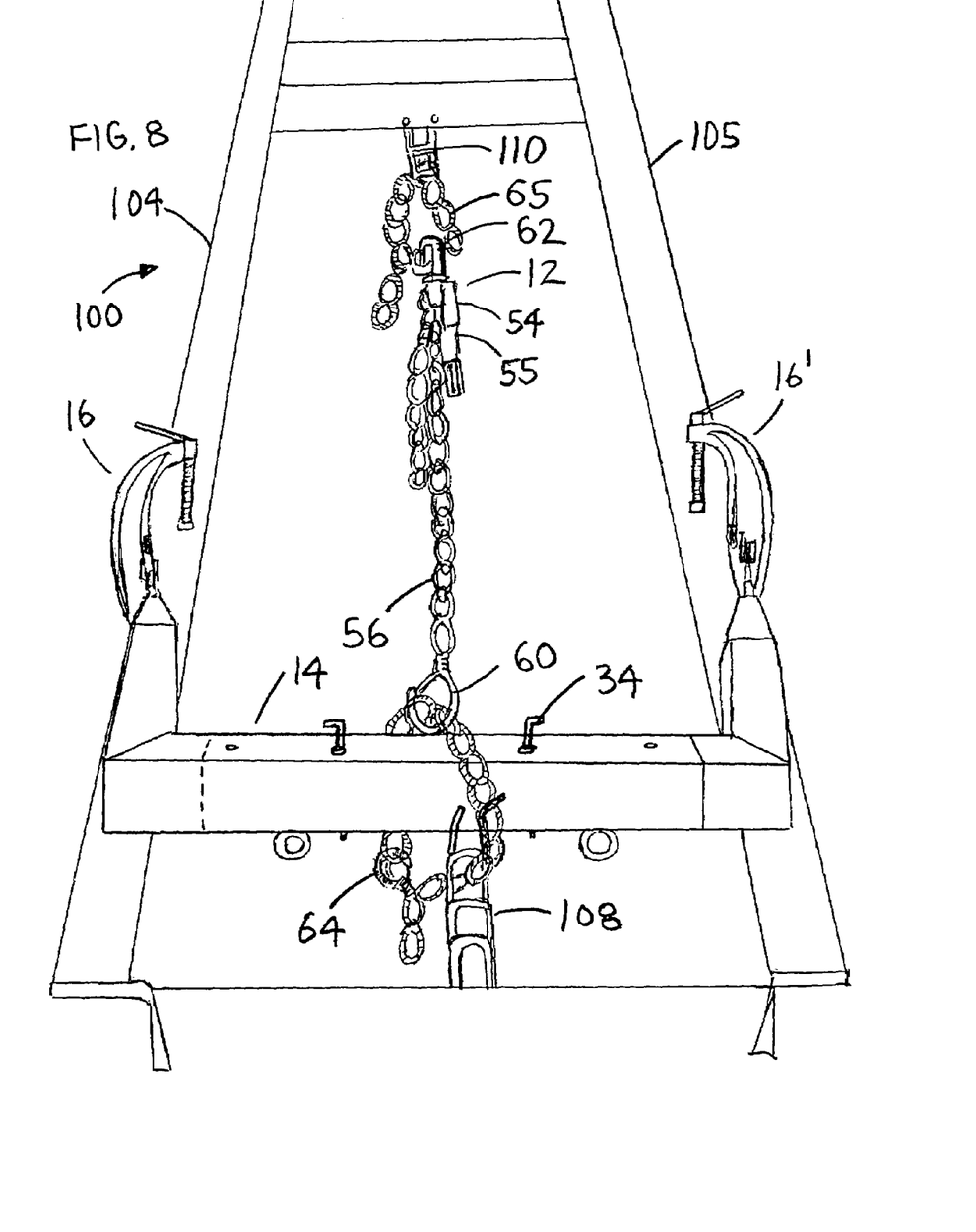
FIG. 8 is a perspective view of a slat conveyor frame with an anchor bar attached thereto and a ratchet puller being coupled to each end of a broken conveyor chain in accordance with the present invention.

With reference now to the drawings, and particularly to FIG. 1, there is shown a perspective view of a slat conveyor 100 with an anchor bar 10 attached thereto of a method of repairing a slat conveyor. With reference to FIGS. 7-8, the method of repairing a slat conveyor includes an anchor bar 10 and a ratchet puller 12. The anchor bar 10 preferably includes an anchor frame 14 and a pair of C-clamps 16, 16'. With reference to FIG. 4, the anchor frame 14 preferably includes a first L-frame 18 and a second L-frame member 20. The first L-frame 18 includes a first base leg 22 and a first link leg 24 that extends from an end of the first base leg 22. The second L-frame 20 includes a second base leg 26 and a second link leg 28 that extends from an end of the second base leg 26. An inner perimeter of the first base leg 22 is preferably sized to receive an outer perimeter of the second base leg 26. A plurality of first location holes 30 are formed through the first base leg 22 and a plurality of second location holes 32 are formed through the second base leg 26 to receive at least one location pin 34. At least one eye bolt 36 may be attached to at least one of the first and second base legs. The at least one eye bolt 36 allows a drop light to be hung from the anchor frame 14. Ratchet pullers are well known in the art and need not be explained in detail. Applicant hereby incorporates by reference the ratchet pullers displayed on the website, lkgoowin.com.

Figure 2:
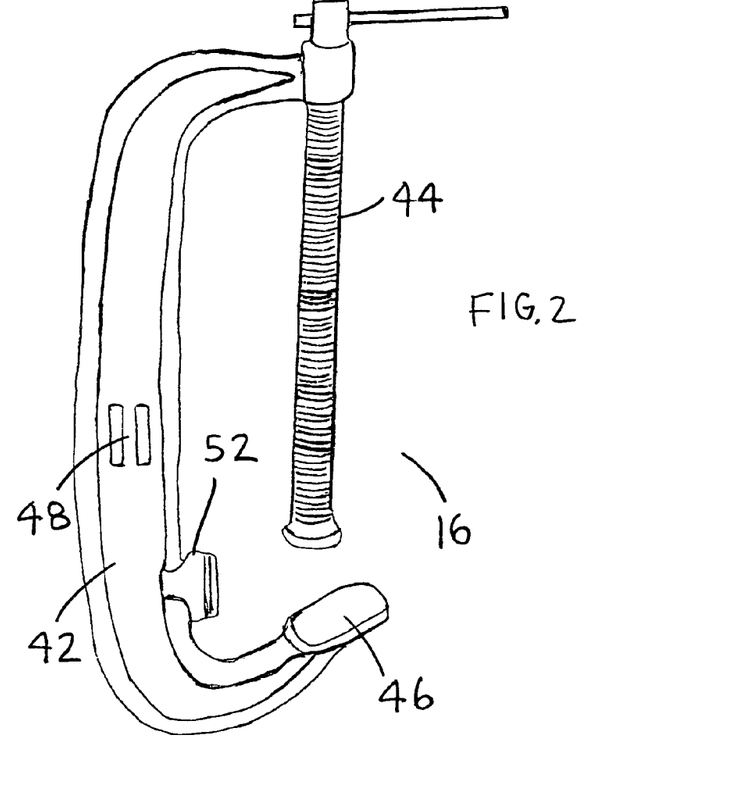
FIG. 2 is a perspective view of a C-clamp of a method of repairing a slat conveyor in accordance with the present invention.
Figure 3:
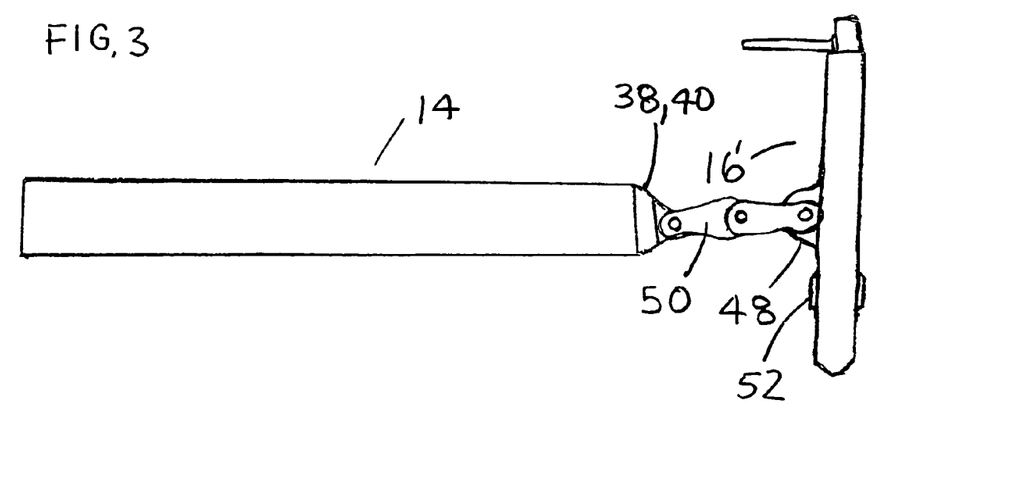
FIG. 3 is a side view of an anchor bar of a method of repairing a slat conveyor in accordance with the present invention.

A first link connector 38 is attached to an end of the first link leg 24 and a second link connector 40 is attached to an end of the second link leg 24. With reference to FIG. 2, the C-clamp 16 includes a C-body 42, a clamp screw 44 and a rest pad 46. A link extension 48 is formed on a side of the C-body 42. C-clamp 16' is a mirror image of C-clamp 16. With reference to FIG. 3, at least one link 50 pivotally couples the first or second link connector to the link extension 48. A frame guard bumper 52 is preferably attached to an edge of the C-body 42. The frame guard bumper 52 prevents the C-body 42 from rotating relative to a first conveyor frame rail 104 and a second conveyor frame rail 105.

Figure 5:
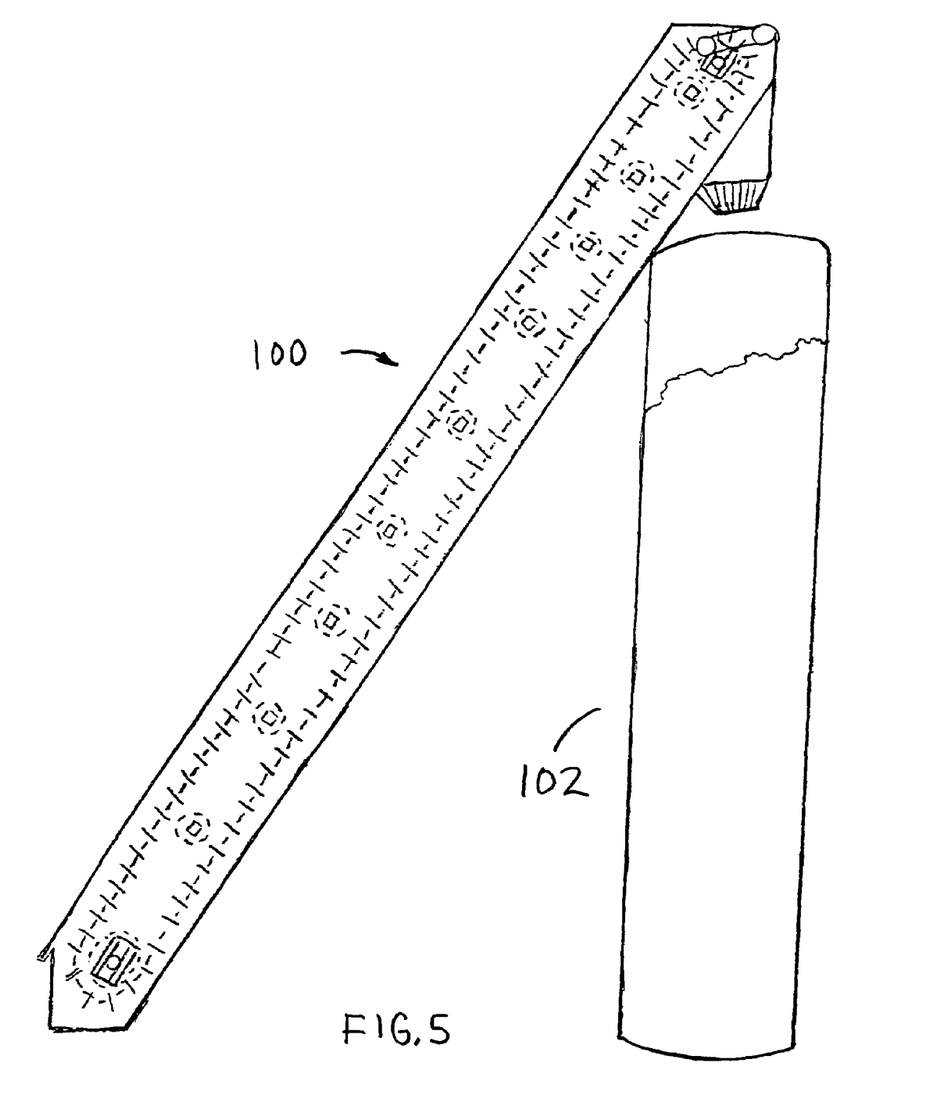
FIG. 5 is a side view of an end of a slat conveyor over a silo in accordance with the present invention.
Figure 6:
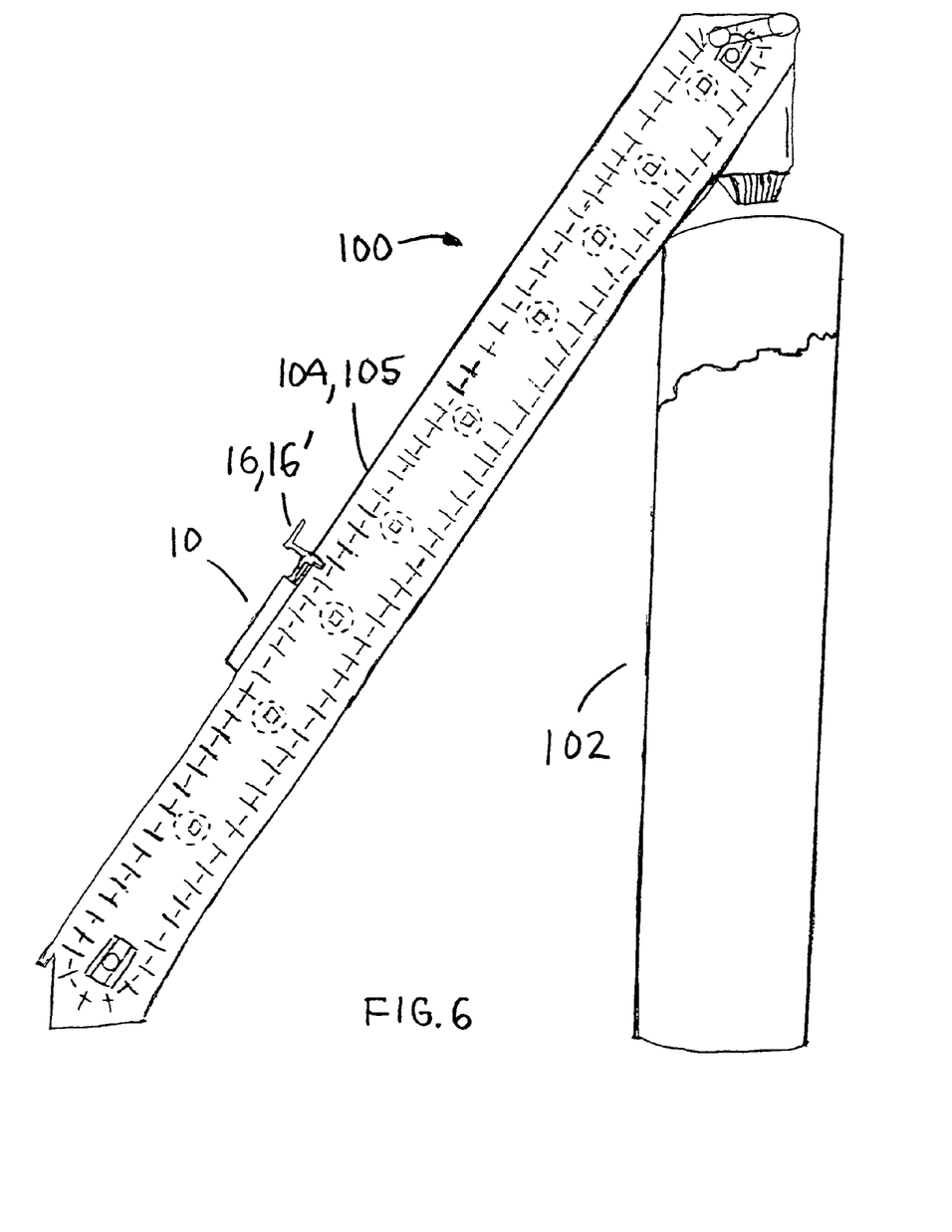
FIG. 6 is a side view of an anchor bar attached to a slat conveyor and an end of the slat conveyor over a silo in accordance with the present invention.

With reference to FIG. 5, the slat conveyor 100 is shown positioned over an asphalt silo 102. With reference to FIG. 6, the C-clamps 16, 16' of the anchor bar 10 are attached to the first conveyor frame rail 104 and the second conveyor frame rail 105 of the slat conveyor 100. With reference to FIGS. 7-8, the ratchet puller 12 includes a ratchet member 54 and a pulling chain 56 extending from one side of the ratchet member 54. A first hook 60 extends from an end of the pulling chain 56. A second hook 62 extends from the other side of the ratchet member 54. A broken conveyor chain 106 includes a first end 108 and a second end 110.

Preferably, a first capture chain 64 is inserted through an unbroken link of the first end 108 of the broken conveyor chain 106 and wrapped around the anchor frame 14. The first hook 60 is engaged with links of the capture chain 64. A second capture chain 65 is preferably inserted through the second end 110 of the broken conveyor chain 106. The second hook 62 is engaged with links of the second capture chain 65. A ratchet lever 55 of the ratchet member 54 is actuated, until the first end 108 meets the second end 110 of the broken conveyor chain 106. However, the ratchet puller 12 may be utilized without the first and second capture chains.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of repairing a slat conveyor, comprising the steps of:
   providing an anchor bar having an anchor frame, a first C-clamp and a second C-clamp, a first end of said anchor frame being coupled to said first C-clamp, a second end of said anchor frame being coupled to said second C-clamp;
   attaching said first C-clamp to a first frame rail of the slat conveyor, attaching said second C-clamp to a second frame rail of the slat conveyor; and
   providing a ratchet puller having a first hook and a second hook, attaching said first hook around a first end of a broken conveyor chain and said frame rail, attaching said second hook to a second end of the broken conveyor chain, actuating said ratchet puller to make the first and second ends of the broken conveyor chain meet.

2. The method of repairing a slat conveyor of claim 1, further comprising the step of:
   inserting a first capture chain through the first end of the broken conveyor chain, wrapping said capture chain around said anchor frame, engaging said capture chain with first hook.

3. The method of repairing a slat conveyor of claim 1, further comprising the step of:
   inserting a second capture chain through the second end of the broken conveyor chain, engaging said second capture chain with said second hook.

4. The method of repairing a slat conveyor of claim 1, further comprising the step of:
   providing said ratchet puller with a ratchet member and a pulling chain extending from one side of said ratchet member, said first hook extending from an end of said pulling chain, said second hook extending from the other side of said ratchet member.

5. The method of repairing a slat conveyor of claim 1, further comprising the step of:
   coupling said first C-clamp to said first end of said anchor frame with at least one first link, coupling said second C-clamp to said second end of said anchor frame with at least one second link.

6. The method of repairing a slat conveyor of claim 1, further comprising the step of:
   providing said anchor frame with a first L-frame and a second L-frame, said first L-frame being sized to slidably receive said second L-frame.

7. The method of repairing a slat conveyor of claim 6, further comprising the step of:
   forming a plurality of first location holes through said first L-frame, forming a plurality of second location holes through said second L-frame to receive at least one location pin.

8. A method of repairing a slat conveyor, comprising the steps of:
   providing an anchor bar having an anchor frame, a first C-clamp and a second C-clamp, a first end of said anchor frame being coupled to said first C-clamp, a second end of said anchor frame being coupled to said second C-clamp;
   attaching said first C-clamp to a first frame rail of the slat conveyor, attaching said second C-clamp to a second frame rail of the slat conveyor; and
   providing a ratchet puller having a pulling chain extending from one side thereof and terminated with a first hook, a second hook extending from the other side of said ratchet puller, inserting said first hook through a first end of a broken conveyor chain, wrapping said pulling chain around said anchor frame, engaging said first hook with said pulling chain, attaching said second hook to a second end of the broken conveyor chain, actuating said ratchet puller to make the first and second ends of the broken conveyor chain meet.

9. The method of repairing a slat conveyor of claim 8, further comprising the step of:
   inserting a first capture chain through the first end of the broken conveyor chain, wrapping said capture chain around said anchor frame, engaging said capture chain with said first hook.

10. The method of repairing a slat conveyor of claim 8, further comprising the step of:
    inserting a second capture chain through the second end of the broken conveyor chain, engaging said second capture chain with said second hook.

11. The method of repairing a slat conveyor of claim 8, further comprising the step of:
    coupling said first C-clamp to a first end of said anchor frame with at least one first link, coupling said second C-clamp to a second end of said anchor frame with at least one second link.

12. The method of repairing a slat conveyor of claim 8, further comprising the step of:

providing said anchor frame with a first L-frame and a second L-frame, said first L-frame being sized to slidably receive said second L-frame.

13. The method of repairing a slat conveyor of claim 12, further comprising the step of:

forming a plurality of first location holes through said first L-frame, forming a plurality of second location holes through said second L-frame to receive at least one location pin.

14. A method of repairing a slat conveyor, comprising the steps of:

providing an anchor bar having an anchor frame, a first C-clamp and a second C-clamp, a first end of said anchor frame being coupled to said first C-clamp, a second end of said anchor frame being coupled to said second C-clamp;

attaching said first C-clamp to a first frame rail of the slat conveyor, attaching said second C-clamp to a second frame rail of the slat conveyor; and providing a ratchet puller having a first hook and a second hook, inserting a first capture chain through a first end of the broken conveyor chain, wrapping said capture chain around said anchor frame, engaging said first hook with said first capture chain, engaging said second hook with a second end of the broken conveyor chain, actuating said ratchet puller to make the first and second ends of the broken conveyor chain meet.

15. The method of repairing a slat conveyor of claim 14, further comprising the step of:

inserting a second capture chain through the second end of the broken conveyor chain, engaging said second hook with said second capture chain.

16. The method of repairing a slat conveyor of claim 14, further comprising the step of:

providing said ratchet puller with a ratchet member and a pulling chain extending from one side of said ratchet member, a first hook extending from an end of said pulling chain, a second hook extending from the other side of said ratchet member.

17. The method of repairing a slat conveyor of claim 14, further comprising the step of:

coupling said first C-clamp to a first end of said anchor frame with at least one first link, coupling said second C-clamp to a second end of said anchor frame with at least one second link.

18. The method of repairing a slat conveyor of claim 14, further comprising the step of:

providing said anchor frame with a first L-frame and a second L-frame, said first L-frame being sized to slidably receive said second L-frame.

19. The method of repairing a slat conveyor of claim 18, further comprising the step of:

forming a plurality of first location holes through said first L-frame, forming a plurality of second location holes through said second L-frame to receive at least one location pin.

* * * * *